(12) United States Patent
Scarcella et al.

(10) Patent No.: US 7,104,076 B2
(45) Date of Patent: Sep. 12, 2006

(54) LUBRICANT RETURN SCHEMES FOR USE IN REFRIGERANT CYCLE

(75) Inventors: Jason D. Scarcella, Cicero, NY (US); Alexander Lifson, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 66 days.

(21) Appl. No.: 10/876,052

(22) Filed: Jun. 24, 2004

(65) Prior Publication Data

US 2005/0284156 A1 Dec. 29, 2005

(51) Int. Cl.
*F25B 43/02* (2006.01)

(52) U.S. Cl. .......................................... 62/84; 62/470

(58) Field of Classification Search .................... 62/84, 62/126, 127, 129, 181, 183, 186, 209, 217, 62/470, 228.3
See application file for complete search history.

(56) References Cited

U.S. PATENT DOCUMENTS

| | | | | |
|---|---|---|---|---|
| 4,404,811 A | * | 9/1983 | Mount et al. | 62/84 |
| 4,697,431 A | * | 10/1987 | Alsenz | 62/225 |
| 4,974,420 A | * | 12/1990 | Kramer | 62/115 |
| 5,058,390 A | * | 10/1991 | Sindermann et al. | 62/181 |
| 5,150,581 A | * | 9/1992 | Smith | 62/115 |
| 5,152,673 A | * | 10/1992 | Pettitt et al. | 417/222.2 |
| 5,167,492 A | * | 12/1992 | Kent et al. | 417/222.2 |
| 5,327,997 A | * | 7/1994 | Nash et al. | 184/6.4 |
| 5,522,231 A | * | 6/1996 | Kenyon et al. | 62/129 |
| 5,634,345 A | * | 6/1997 | Alsenz | 62/84 |
| 5,842,354 A | * | 12/1998 | Kawasumi et al. | 62/206 |
| 5,884,494 A | * | 3/1999 | Okoren et al. | 62/126 |
| 6,044,651 A | * | 4/2000 | Reason et al. | 62/161 |
| 6,058,729 A | * | 5/2000 | Lifson et al. | 62/217 |
| 6,112,534 A | * | 9/2000 | Taras et al. | 62/217 |
| 6,116,046 A | * | 9/2000 | Leaver et al. | 62/473 |
| 6,209,338 B1 | | 4/2001 | Thatcher, Jr. | |
| 6,226,998 B1 | * | 5/2001 | Reason et al. | 62/230 |
| 6,481,227 B1 | * | 11/2002 | Ota et al. | 62/209 |
| 6,672,844 B1 | * | 1/2004 | Fukanuma et al. | 417/222.2 |
| 2003/0051503 A1 | | 3/2003 | Nobuta et al. | |
| 2003/0061825 A1 | | 4/2003 | Sullivan | |

FOREIGN PATENT DOCUMENTS

JP 200-2468 A * 1/2000

OTHER PUBLICATIONS

International Search Report, Sep. 12, 2005.

* cited by examiner

*Primary Examiner*—Mohammad M. Ali
(74) *Attorney, Agent, or Firm*—Carlson, Gaskey & Olds

(57) ABSTRACT

A control algorithm is developed which takes corrective action in the event that system conditions indicate there may be an inadequate flow of lubricant in the system. In particular, if a discharge pressure is below a predetermined amount or if the suction modulation valve is throttled, there is a possibility of inadequate lubricant flow. The system control then turns off the condenser fan, and if that first step is not sufficient, may also turn on an evaporator heater and then control a suction modulation valve. A fail safe control loop also takes effect if the condition sensor appears to have failed.

24 Claims, 2 Drawing Sheets

LUBRICANT RETURN SCHEMES FOR USE IN REFRIGERANT CYCLE

BACKGROUND OF THE INVENTION

This invention relates to schemes for improving lubricant flow, and in particular, the return of lubricant from various locations in a refrigerant cycle back to a compressor, to prevent an inadequate supply of lubricant to the compressor.

Refrigerant cycles typically include a compressor for compressing a refrigerant and delivering that refrigerant downstream to a condenser. From the condenser the refrigerant passes to an expansion device that expands the refrigerant. From the expansion device, refrigerant moves to an evaporator. The evaporator is a heat exchanger that typically changes the temperature in an environment to be conditioned. From the evaporator, the refrigerant may run through a modulation valve before returning to the compressor. The evaporator often captures refrigerant and lubricant as it has traveled through the refrigerant cycle. Lubricant is typically necessary in the compressor to lubricate the moving parts. However, as the lubricant is delivered to the compressor, it is often entrained in and with the refrigerant, and travels through the refrigerant cycle. While the evaporator is specifically mentioned, oil can accumulate in other locations, and the present invention assists in returning oil from these other locations.

The conditions in the evaporator often result in lubricant leaving the refrigerant, and remaining trapped in the evaporator. At some point, there may be an inadequate supply of lubricant in the compressor, which is undesirable. Oil retention in the evaporator can also adversely affect the heat transfer within the evaporator, reducing efficiency and capacity of the unit, which is also undesirable.

SUMMARY OF THE INVENTION

In a disclosed embodiment of this invention, a number of schemes are identified which are made operational once a control senses conditions that could lead to an inadequate supply of lubricant. Preferably, the condition sensed is a discharge refrigerant pressure. Of course, other conditions such as suction pressure, etc. can be sensed. One main scheme is to periodically turn off the fan driving air over the condenser. This will increase the refrigerant pressure. As the refrigerant pressure increases, the likelihood of lubricant remaining in the evaporator decreases.

A control monitors whether this stoppage of the condenser fan is effective to change conditions that are likely indicative of an approaching lubricant shortage. If the conditions continue for a period of time, then a second scheme is implemented. In one embodiment the second scheme includes turning on heater elements that are associated with the evaporator. This increases the load on the evaporator, and ensures that refrigerant mass flow through the evaporator increases.

Increasing mass flow would tend to entrain more lubricant, and take that lubricant back to the compressor. Further, the increased mass flow traveling through the evaporator ensures that the temperature change in the refrigerant is less at the evaporator. This reduces the likelihood of the refrigerant being boiled out of a lubricant/refrigerant mixture, such that more lubricant is returned to the compressor.

In a third scheme, if the first two schemes do not operate to correct the problem, a suction modulation valve (SMV) is actuated to open and allow increased mass flow of refrigerant to the compressor. Again, this ensures that lubricant is less likely to remain in the evaporator.

Of course, the disclosed sequences can be changed and the corrective steps taken in any other order.

In another aspect of this invention, a method is devised to ensure the lubricant is returned to the compressor, even if the transducer for supplying the discharge pressure information to the control is broken. The various schemes as mentioned above may be utilized under certain conditions if the transducer is no longer providing a valid signal.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
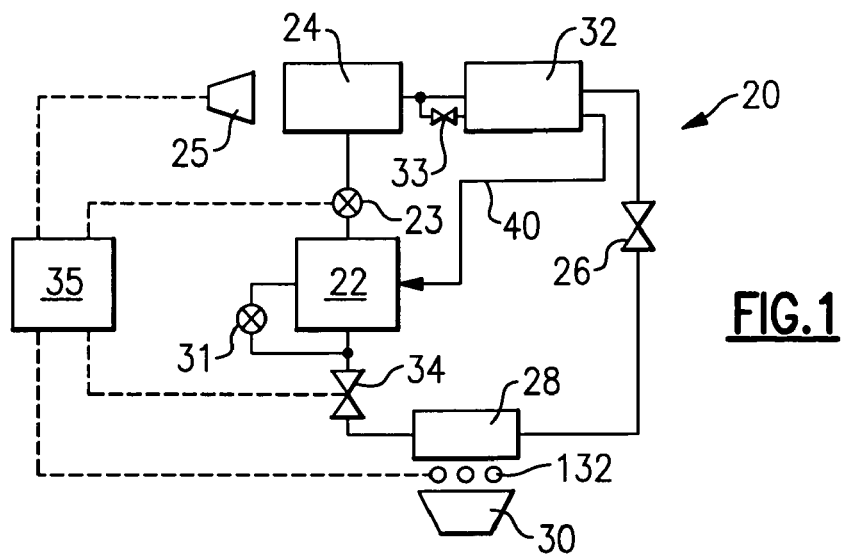
FIG. 1 illustrates a standard refrigerant cycle.

A refrigerant cycle 20 is illustrated in FIG. 1 having a compressor 22 compressing a refrigerant and delivering the refrigerant to a downstream condenser 24. A fan 25 blows air over the condenser 24. Typically, the condenser is an outdoor heat exchanger.

From the condenser 24 refrigerant travels to an expansion device 26, and from the expansion device 26 to an evaporator 28. The evaporator is an indoor heat exchanger. As shown, a fan 30 blows air over the evaporator, and that air is typically delivered into an environment to be conditioned. As also shown schematically, heater elements 132 are associated with the evaporator. These heater elements have been placed into some prior art evaporators to melt ice that may accumulate on the evaporator.

A suction modulation valve 34 is positioned downstream of the evaporator, and upstream of the compressor 22. The suction modulation valve is able to modulate the suction pressure of the refrigerant reaching the compressor 22, and is also a known component.

A control 35 is associated with the cycle 20, and operates the fan 25, heater coil 132 and the suction modulation valve 34. Further, as shown, a discharge pressure transducer (DPT) 23 is positioned downstream of the compressor 22. This transducer provides a signal indicative of the refrigerant discharge pressure leaving the compressor.

As shown, an economizer heat exchanger 32 is incorporated into the refrigerant cycle 20. A tap line and economizer expansion device 33 expands a portion of the refrigerant that is returned through a line 40 to an intermediate point in the compression cycle of the compressor 22. As is known, a main flow of refrigerant passing downstream to the main expansion device 26 is subcooled by this economizer cycle. As also shown, an unloader line 31 selectively communicates refrigerant that has been compressed in the compressor 22 back to a suction line for the compressor. In a preferred embodiment, this unloader line can be incorporated with the refrigerant return line 40. More complex and less complex refrigerant systems would benefit from the teachings of this application.

As mentioned above, under certain conditions, the flow of lubricant oil through a heat exchanger (normally an evaporator heat exchanger would retain most of the oil, but some retention of oil can also be expected in the condenser heat exchanger as well as economizer heat exchanger, if it is present, and adjacent piping associated with any of the system heat exchangers) can become inadequate, with too much oil retained in the system. This can cause an inadequate supply of oil being returned to the compressor 22 and/or detrimentally affect the heat exchanger coil heat transfer thus reducing the operating efficiency and capacity of the refrigerant cycle. Thus, a flowchart is shown in FIG. 2 of a control algorithm for at least periodically ensuring that lubricant is returned to the compressor.

Figure 2:
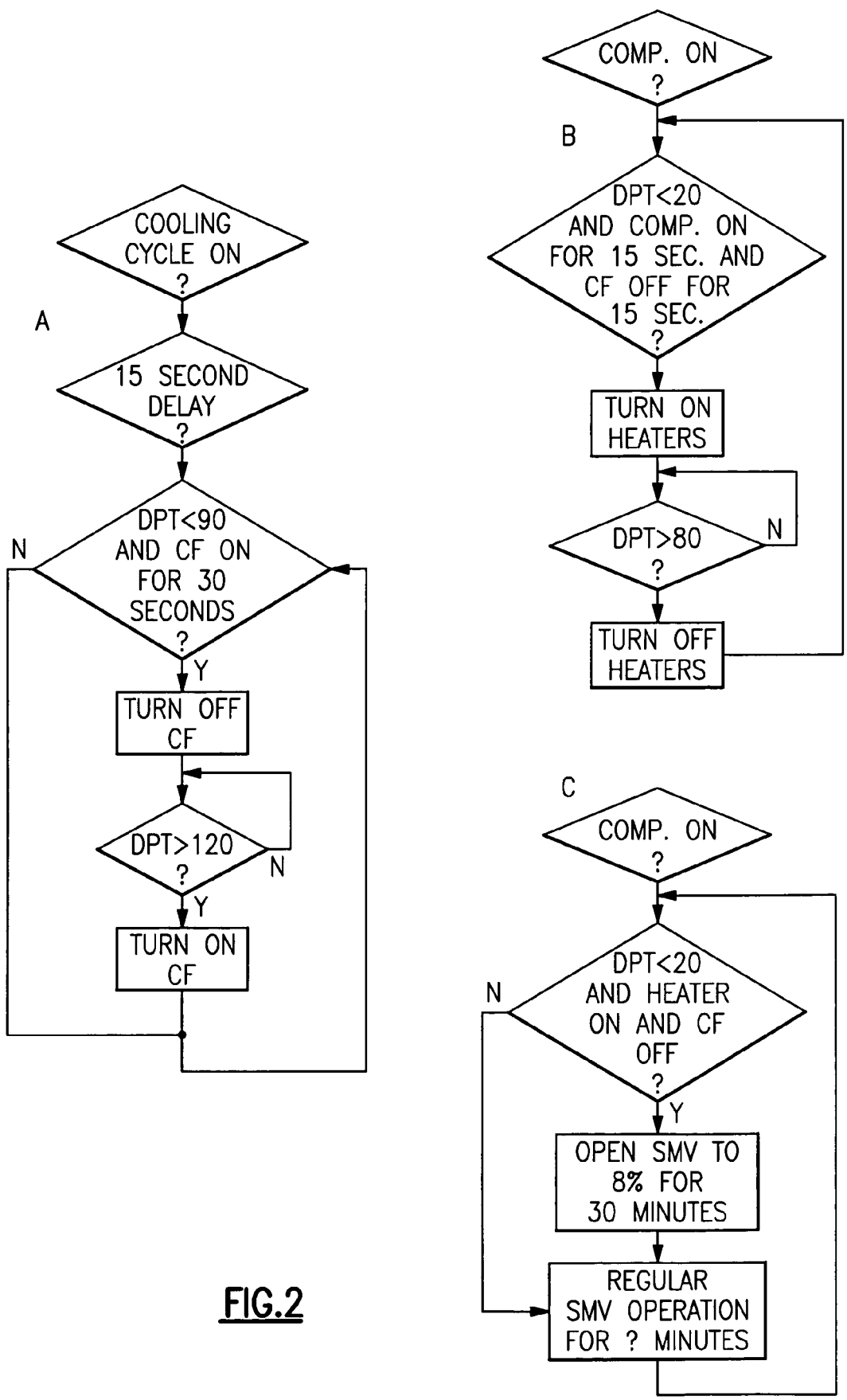
FIG. 2 is a flowchart for operating the FIG. 1 refrigerant cycle.

As shown in FIG. 2, once a cooling cycle has begun, a delay is left to allow the system to adjust to steady state. In the embodiment shown in FIG. 2, fifteen seconds delay is set. However, as with all numerical information provided on the flowcharts of FIGS. 2 and 3, this is merely an example. Other time periods would be within the scope of this invention, as would other numerical values to any of the values shown in FIG. 2 or 3.

Once the delay has passed, the control passes to an IF box which asks whether DPT is less than a particular pressure. If the DPT is less than this predetermined pressure, and if the condenser fan 25 has been on for a certain period of time, then a determination is made that there is a potential likelihood of inadequate lubricant being returned to the compressor 22.

If either the condenser fan 25 has not been on for a certain period of time, or if the DPT is above the predetermined pressure (i.e., a no to either), then the system simply returns to steady state monitoring.

However, if the answer to both questions is yes, the algorithm continues on to the step of turning off the condenser fan 25. The control then goes to another IF box which asks periodically whether the DPT has increased above another value, shown here to be significantly higher than the predetermined value at the initial IF box. As long as the pressure has not increased back to this higher number, the control maintains a loop. Once the DPT has increased up to this number, the condenser fan is turned back on. By turning off the condenser fan, the discharge pressure should be increased. This increased pressure ensures lubricant is driven from the evaporator by overcoming the frictional resistance between the lubricant itself and between the lubricant and evaporator material. Also provided are the benefits of increased solubility (more refrigerant is driven into the lubricant) and reduced viscosity (refrigerant/lubricant mixture is "thinned" out).

As further shown in FIG. 2, the answer at the second IF box is also provided back to other control loops. If the condenser fan has remained off for a period of time, then the control moves to a second control scheme B having an IF box asking whether DPT is below another pressure (preferably much lower than either of the pressures asked in the control scheme A), and whether the condenser fan has been off for a certain period of time. If the answer to either question is no, the control maintains a loop. On the other hand, if the answer to both is yes, the heaters 32 at the evaporator are turned on. This provides the benefit of increasing the heat load that must be absorbed by the evaporator 28 and thus increasing mass flow of refrigerant through the evaporator. This will ensure lubricant is returned to the compressor. In addition, by increasing the mass flow, the temperature change per unit of refrigerant in the evaporator is reduced. By reducing the amount of temperature change, one reduces the likelihood of boiling off refrigerant from a refrigerant/lubricant mixture, thus ensuring more of the lubricant is returned to the compressor.

After the heaters are turned on, the system moves to asking whether the DPT has increased to a predetermined level. As long as the DPT has not yet reached that level, the loop will continue. Once the DPT has reached that level, the heaters 32 will be turned back off and the system will be turned to the initial IF box.

At the same time, a method under this invention may include yet a third control scheme C. If the DPT is less than a predetermined value, and the heaters have been on for a period of time, and the condenser fan has been off for a period of time, then the suction modulation valve is opened to a relatively large opening for a predetermined period of time. This will ensure the amount of refrigerant passing to the compressor increases, and also increases the amount of refrigerant leaving the evaporator. Increasing refrigerant flow through the evaporator again increases the refrigerant/lubricant ratio thus increasing solubility and decreasing viscosity. With the refrigerant/lubricant mixture "thinned" (viscosity lowered) and an increase in the free flow area, as a result of the increased SMV opening, the lubricant is purged from the evaporator back to the compressor sump.

The present invention thus provides a method of monitoring operation of the refrigerant cycle 20, and moving to take steps that are likely to increase the flow of lubricant back to the compressor in the event conditions are indicative of the possibility of inadequate lubricant being returned.

It should be understood that other sequences of operation would come within the scope of this invention. That is, the three schemes A, B, and C can be utilized in any order, with the scheme B or C used initially, with any of the other two used second and then third. Of course, for each of the selected sequence, it may not be necessary to use all three schemes, as the problem of oil return may be solved by engaging only one or two schemes.

Figure 3:
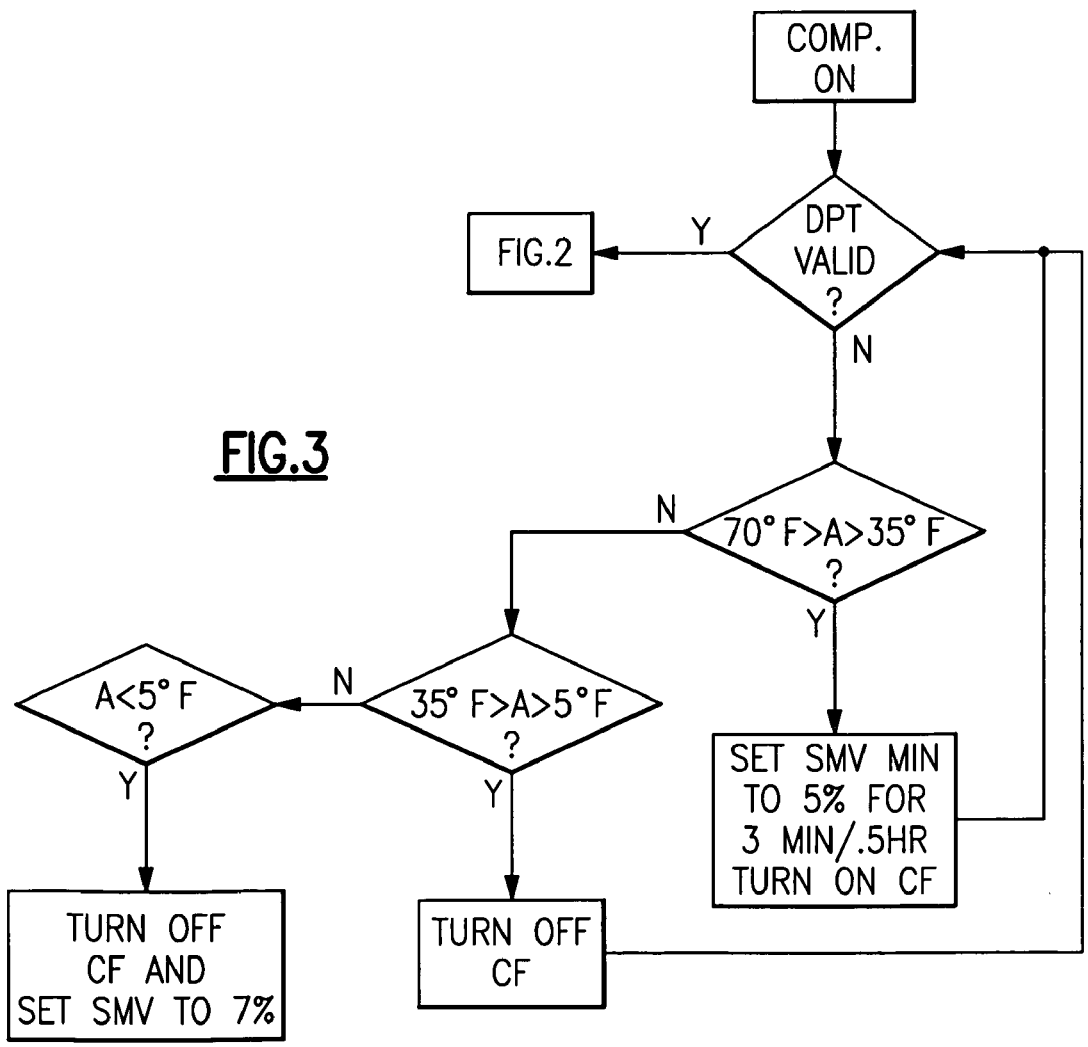
FIG. 3 is a flow chart of a second aspect of this invention.

FIG. 3 shows another flowchart for providing lubricant to the compressor in the event that the DPT sensor 23 has failed. As long as the DPT sensor is seen as valid, normal operation of the FIG. 2 flowchart will occur. There are, of course, many known ways of monitoring sensor feedback to determine whether a signal is valid. This invention does not extend to how the determination is made. Further, this aspect of the invention would extend to other monitored conditions.

Should the signal appear to be invalid, the control asks whether the ambient temperature is between two preset amounts. If the answer is yes, then the SMV is moved to a predetermined open amount for a particular number of minutes per period of time. The condenser fan is maintained on.

If the ambient temperature is not between that first range, the control asks whether the ambient temperature is between a second lower range. If the answer is yes, the condenser fan is turned off. On the other hand, if the temperature is below even that second range, the condenser fan is turned off, and the SMV is moved to a predetermined open amount.

This method is intended to provide a somewhat "fail safe" method of ensuring lubricant will be delivered back to the compressor, even if the discharge pressure transducer is no longer functioning.

Although preferred embodiments of this invention have been disclosed, a workers of ordinary skill in the art would recognize that various modifications of this method would be within the scope of this invention. For that reason, the following claims should be studied to determine the true scope and content of this invention.

What is claimed is:

1. A method of monitoring operation of a refrigerant cycle comprising the steps of:
   (a) monitoring for a condition indicative of an inadequate flow of lubricant;
   (b) taking preventative action should said monitoring of step (a) indicate that an inadequate flow of lubricant exists, said preventative action providing lubricant flow, the preventative steps including turning off a condenser fan associated with a condenser heat exchanger; and the monitoring of step (a) also provided for a second preventative action, said second preventative action is taken if the condition has not changed within a predetermined period of time after the condenser fan has been turned off, and said second preventative action including turning on a heater associated with an evaporator in the event that having turned off said condenser fan for a predetermined period of time has not changed conditions sufficiently.

2. The method as set for in claim 1, wherein said monitoring includes the step of monitoring a discharge pressure downstream of a compressor.

3. The method as set forth in claim 1, wherein once the condenser fan has been turned off, the condition continues to be monitored, and the condenser fan is maintained off until the condition has changed to indicate that the refrigerant cycle is moving to a condition where it is less likely that there will be an inadequate flow of lubricant.

4. The method as set forth in claim 1, wherein once the heater has been turned on, the condition continues to be monitored, and the heater maintained on until the condition is changed to indicate that the refrigerant cycle is moving to a condition where it is less likely that there will be an inadequate flow of lubricant.

5. The method as set forth in claim 1, wherein a third preventative action controls a suction modulation valve in the event that turning off said condenser fan and turning on said heater have not adequately changed said condition.

6. The method as set forth in claim 1, wherein three or less preventative actions are taken in serial order, with said preventative actions including turning off a condenser fan, turning on a heater associated with an evaporator, and controlling the opening in a suction modulation valve.

7. The method as set forth in claim 6, wherein the control of said suction modulation valve is taken as the first corrective action.

8. The method as set forth in claim 1, wherein a compressor associated with the refrigerant cycle continues to be driven while the step (b) occurs.

9. A method of monitoring operation of a refrigerant cycle comprising the steps of:
   (a) monitoring for a condition indicative of an inadequate flow of lubricant;
   (b) taking preventative action should said monitoring of step (a) indicate that an inadequate flow of lubricant exists; and
   (c) a sensor for providing a condition to a control being monitored, and should said sensor appear to be invalid, a second control loop is taken to ensure adequate flow of lubricant, independent of any condition within said refrigerant cycle.

10. The method as set forth in claim 9, wherein said second control loop looks at ambient temperature, and selects a particular scheme for ensuring adequate flow of lubricant based upon ambient temperature.

11. The method as set forth in claim 10, wherein a first ambient temperature range looks to whether the ambient temperature is in a higher range, and controls a suction modulation valve in the event the ambient temperature is within this range, if the ambient temperature is below this range, then the control turning off a condenser fan.

12. A method of monitoring operation of a refrigerant cycle comprising the steps of:
   (a) monitoring for a condition indicative of an inadequate flow of lubricant;
   (b) taking preventative action should said monitoring of step (a) indicate that an inadequate flow of lubricant exists, said preventative action providing lubricant flow;
   wherein step (b) includes taking three or less preventative actions in serial order, with said preventative actions including turning off a condenser fan, turning on a heater associated with an evaporator, and controling the opening in a suction modulation valve, and turning on said heater is taken as a first corrective action.

13. A refrigerant cycle comprising:
   a compressor delivering a refrigerant to a condenser, said condenser having a fan for blowing air over said condenser, said refrigerant being delivered from said condenser to a downstream expansion device, and said refrigerant being delivered from said expansion device to an evaporator, refrigerant being delivered from said evaporator through a modulating valve back to the compressor;
   a control for controlling said refrigerant cycle, said control monitoring a condition within said refrigerant cycle, and determining whether conditions are indicative of a an inadequate flow of lubricant, said control taking a corrective action to provide lubricant flow if said conditions are indicative of an inadequate flow of lubricant;
   the preventative steps including turning off a condenser fan associated with a condenser heat exchanger;
   said monitored condition is also provided for a second preventative action, said second preventative action asking whether the conditions have changed within a predetermined period of time after the condenser fan has been turned off, and said second preventative action including turning a heater associated with an evaporator in the event that having turned off said condenser fan for a predetermined period of time has not changed conditions sufficiently.

14. The refrigerant cycle as set for in claim 13, wherein said monitoring includes the step of monitoring a discharge pressure downstream of the compressor.

15. The refrigerant cycle as set forth in claim 13, wherein once the condenser fan has been turned off, the condition continues to be monitored, and the condenser fan is maintained off until the condition has changed to indicate that the refrigerant cycle is moving to a condition where it is less likely that there will be an inadequate flow of lubricant.

16. The refrigerant cycle as set forth in claim 13, wherein once the heater has been turned on, the condition continues to be monitored, and the heater maintained on until the condition is changed to indicate that the refrigerant cycle is moving to a condition where it is less likely that there will be an inadequate flow of lubricant.

17. The refrigerant cycle as set forth in claim 16, wherein a third preventative action controls a suction modulation valve in the event that turning off said condenser fan and turning on said heater have not adequately changed said condition.

18. The refrigerant cycle as set forth in claim 13, wherein said compressor continues to be driven while the corrective action is taking place.

19. A refrigerant cycle comprising:
a compressor delivering a refrigerant to a condenser, said condenser having a fan for blowing air over said condenser, said refrigerant being delivered from said condenser to a downstream expansion device, and said refrigerant being delivered from said expansion device to an evaporator, refrigerant being delivered from said evaporator through a modulating valve back to the compressor;
a control for controlling said refrigerant cycle, said control monitoring a condition within said refrigerant cycle, and determining whether conditions are indicative of a an inadequate flow of lubricant, said control taking a corrective action if said conditions are indicative of an inadequate flow of lubricant; and
a sensor for providing a condition to the control being monitored, and should said sensor appear to be invalid, a second control loop is taken to ensure lubricant flow, independent of any condition within said refrigerant cycle.

20. The refrigerant cycle as set forth in claim 19, wherein said second control loop looks at ambient temperature, and selects a particular scheme for ensuring lubricant flow based upon ambient temperature.

21. The refrigerant cycle as set forth in claim 20, wherein a first ambient temperature range looks to whether the ambient temperature is in a higher range, and controls a suction modulation valve in the event the ambient temperature is within this range, if the ambient temperature is below this range, then the control turning off a condenser fan.

22. A refrigerant cycle comprising:
a compressor delivering a refrigerant to a condenser, said condenser having a fan for blowing air over said condenser, said refrigerant being delivered from said condenser to a downstream expansion device, and said refrigerant being delivered from said expansion device to an evaporator, refrigerant being delivered from said evaporator through a modulating valve back to the compressor;
a control for controlling said refrigerant cycle, said control monitoring a condition within said refrigerant cycle, and determining whether conditions arc indicative of a an inadequate flow of lubricant, said control taking a corrective action if said conditions are indicative of an inadequate flow of lubricant, said corrective action includes turning off a condenser fan, turning on a hearer associated with said evaporator, and controlling a suction modulation valve.

23. The refrigerant cycle as set forth in claim 22, wherein said turning on of said heater is taken as a first corrective action, with the other two corrective actions being taken subsequently in serial fashion.

24. The refrigerant cycle as set forth in claim 22, wherein said control of said suction modulation valve is taken as a first corrective action, with the other two of said corrective actions taken subsequently in serial order.

* * * * *

UNITED STATES PATENT AND TRADEMARK OFFICE
CERTIFICATE OF CORRECTION

PATENT NO. : 7,104,076 B2  Page 1 of 1
APPLICATION NO. : 10/876052
DATED : September 12, 2006
INVENTOR(S) : Scarcella et al.

It is certified that error appears in the above-identified patent and that said Letters Patent is hereby corrected as shown below:

Claim 12, Column 6, line 17: "controling" should be --controlling--

Claim 13, Column 6, line 43: Please insert --on-- after "turning".

Claim 22, Column 8, line 14: "arc" should be --are--

Claim 22, Column 8, line 19: "hearer" should be --heater--

Signed and Sealed this

Nineteenth Day of December, 2006

JON W. DUDAS
*Director of the United States Patent and Trademark Office*